April 28, 1953        F. G. CIZEK        2,636,509
ADJUSTABLE PRESSURE HYDRAULIC VALVE SYSTEM
Filed March 28, 1946        3 Sheets-Sheet 1
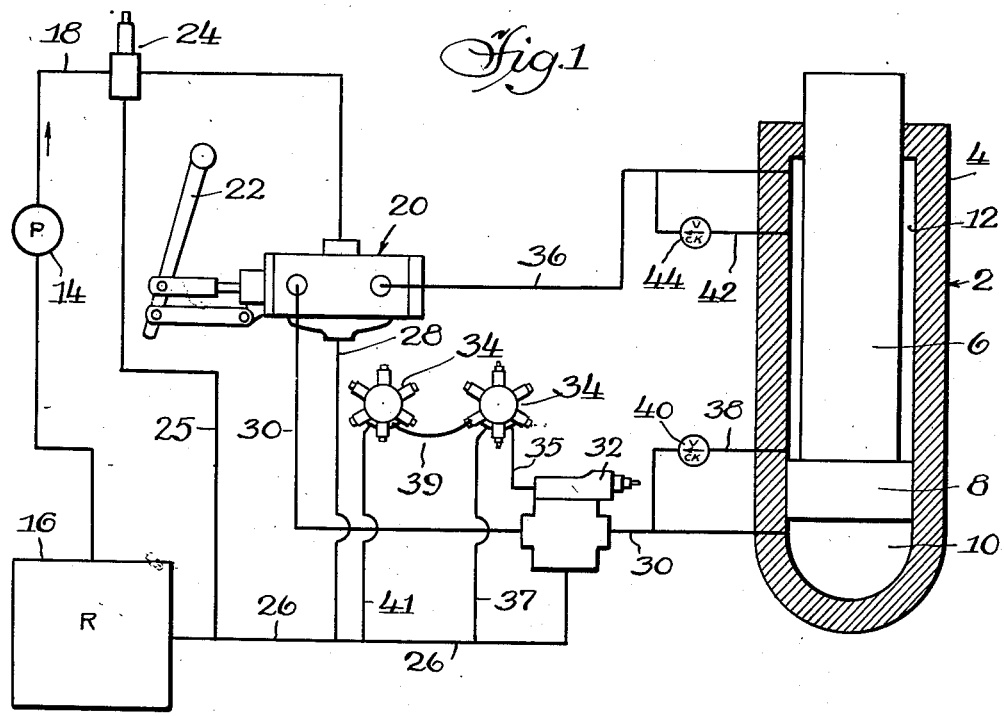
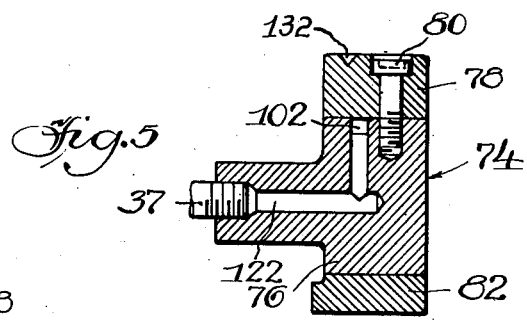
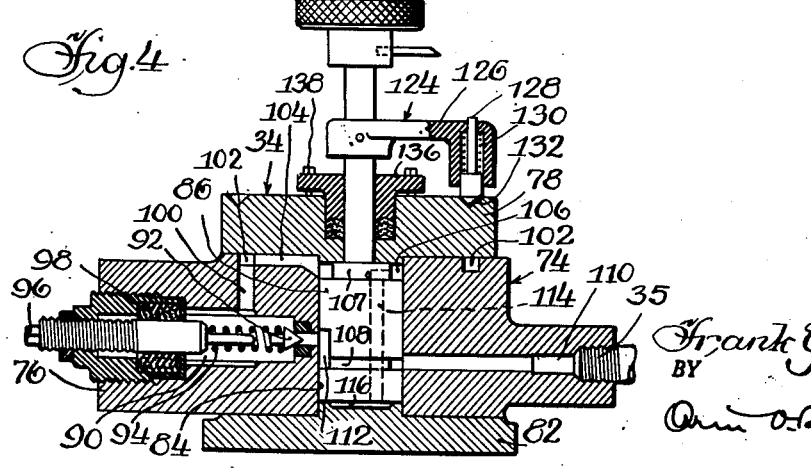
INVENTOR.
Frank G. Cizek,
BY
Orrin O. B. Garner
Atty.

April 28, 1953  F. G. CIZEK  2,636,509
ADJUSTABLE PRESSURE HYDRAULIC VALVE SYSTEM
Filed March 28, 1946  3 Sheets-Sheet 2
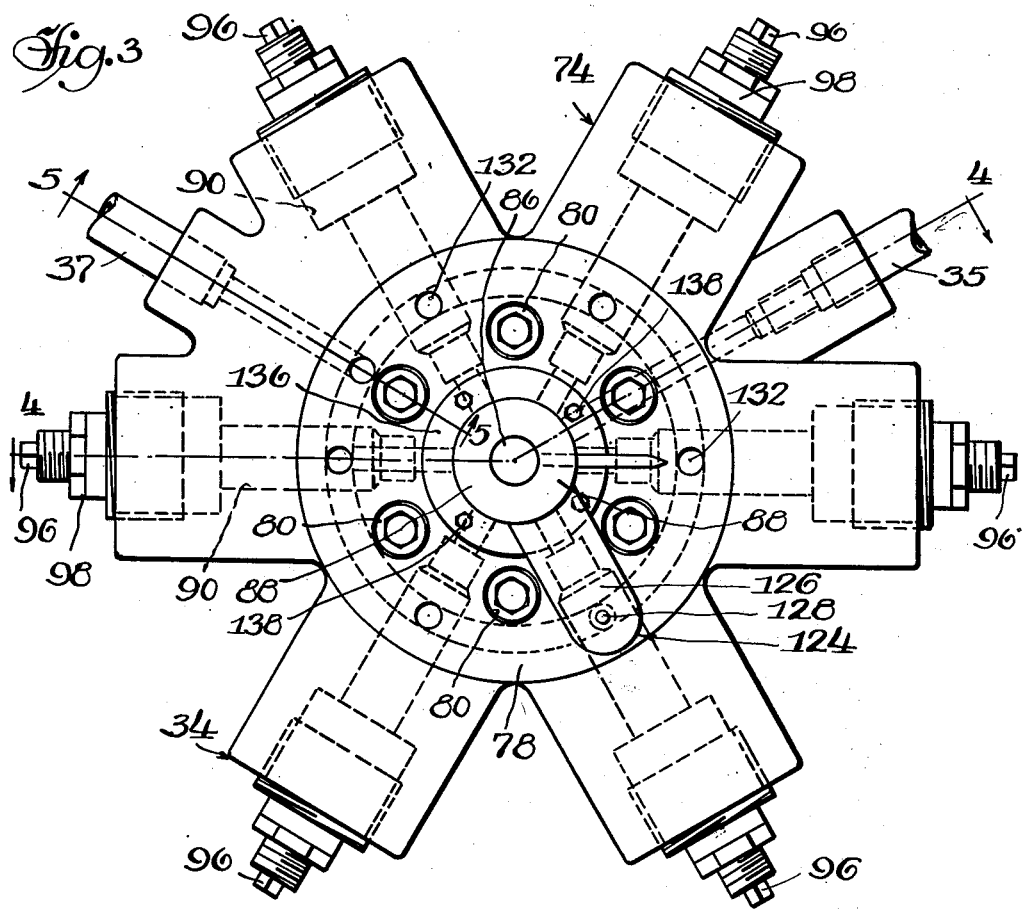
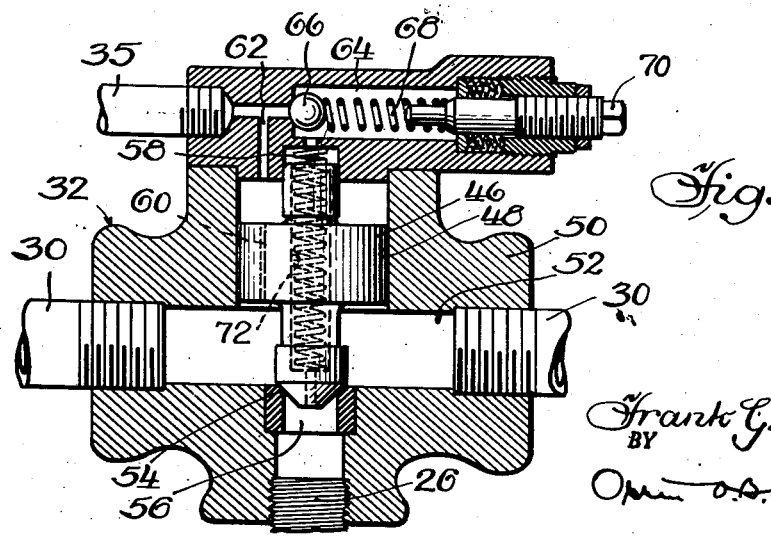
INVENTOR.
Frank G. Cizek,
BY April 28, 1953     F. G. CIZEK     2,636,509
ADJUSTABLE PRESSURE HYDRAULIC VALVE SYSTEM
Filed March 28, 1946     3 Sheets-Sheet 3
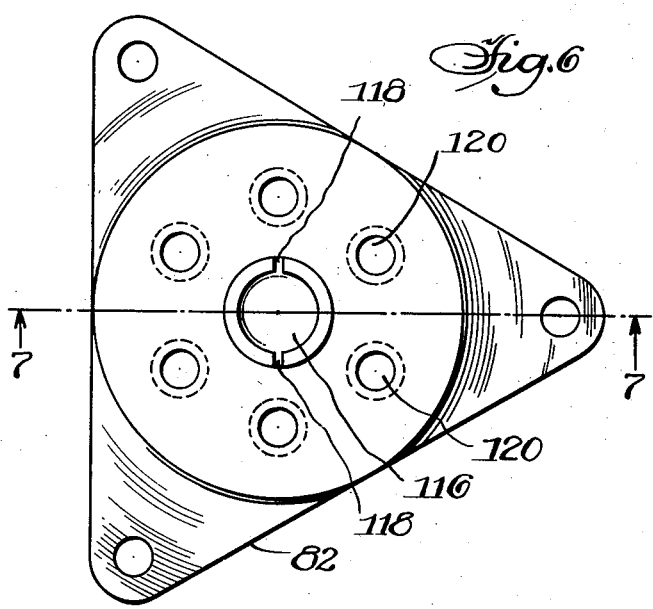
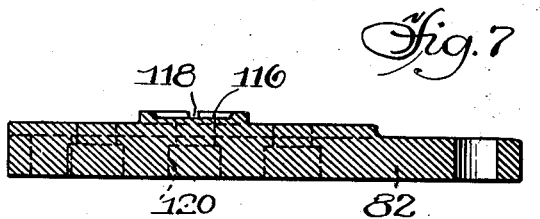
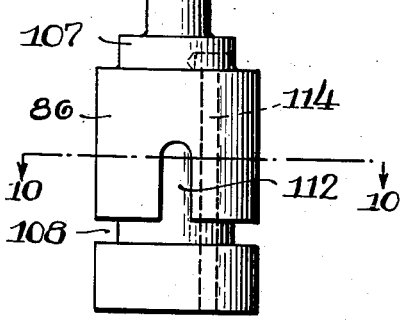
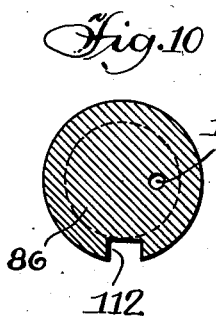
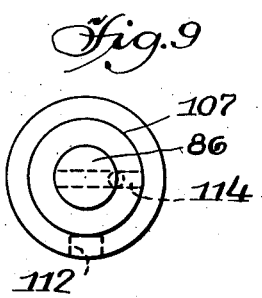
INVENTOR.
Frank G. Cizek
BY
Ann O. B. Garner
Atty.

Patented Apr. 28, 1953

2,636,509

UNITED STATES PATENT OFFICE 2,636,509

ADJUSTABLE PRESSURE HYDRAULIC VALVE SYSTEM

Frank G. Cizek, Chicago, Ill., assignor to American Steel Foundries, Chicago, Ill., a corporation of New Jersey Application March 28, 1946, Serial No. 657,816

5 Claims. (Cl. 137—489)

This invention relates to hydraulic systems comprising hydraulic pressure control valves and more particularly to systems incorporating valves designed to selectively vary the hydraulic pressure.

My invention contemplates an arrangement of a plurality of selectors each of which may have a number of pressure stations, any one of which may be used to conduct pressure to an adjacent selector likewise having a plurality of pressure stations, thus making it possible, for example, to have eleven pressures developed by two selectors, each of which would have six stations.

A general object of the invention is to provide a valve by means of which the operator of a hydraulic machine may select any one of several predetermined operating pressures according to the immediate demand of the work.

Another object of the invention is to design a control system wherein the various desired operating pressures may be preset by someone other than the operator of the machine, whereby an unskilled operator may operate the machine in an easily taught sequence without having knowledge of the pressure requirements or the reasons therefor.

Another object of the invention is to design a system such as above described wherein a pressure relief valve connected to the main supply line of the system is operatively connected to a pressure selector valve by means of which the pressure at which the relief valve opens may be regulated to any one of several predetermined values.

A more specific object of the invention is to design a pressure selector valve comprising a body with a cylindrical bore and a plurality of discharge ports communicating therewith, said bore being adapted for the reception of a complementary stem rotatable therewithin and comprising passage means for selectively placing the ports in communication with the inlet port of the device.

The foregoing and other objects and advantages of the invention will become apparent from a consideration of the following specification and the accompanying drawings wherein:

Figure 1 is a flow diagram of a hydraulic circuit incorporating the novel pressure selector valve, said circuit being operatively connected to a typical hydraulic motor partially shown in central vertical cross section;

Figure 2 is an enlarged central vertical sectional view through the conventional pressure relief valve shown in Figure 1, portions of the valve being shown in elevation;

Figure 3 is an enlarged top plan view of the novel pressure selector valve;

Figure 4 is a sectional view, partly in elevation, of the pressure selector valve taken in the vertical planes indicated by the lines 4—4 of Figure 3;

Figure 5 is a fragmentary vertical sectional view of the pressure selector valve taken in the vertical plane indicated by the line 5—5 of Figure 3;

Figures 6 and 7 illustrate the base plate portion of the selector valve body, Figure 6 being a top plan view of said base portion and Figure 7 being a sectional view taken on the line 7—7 of Figure 6; and Figures 8–10, inclusive, illustrate in detail the pressure selector valve stem or spindle, Figure 8 being a side elevation thereof, Figure 9 being a to plan view thereof, and Figure 10 being a sectional view taken on the line 10—10 of Figure 8.

Describing the invention in detail and referring first to the flow diagram illustrated in Figure 1, the hydraulic motor, generally designated 2, may be of any conventional design and as illustrated is in the form of a cylinder 4 with a ram 6 reciprocal therewithin, said ram comprising an enlarged cylindrical portion 8 slidably fitted within the cylinder to define advance and return chambers 10 and 12, respectively. It will be understood that the system is particularly applicable to a hydraulic press wherein granular material is pressed by means of the ram 6 into cavities of varying cross section. When it is desired to produce a substantially constant density throughout the mass of compressed material in the cavity, the material is often introduced in small increments, each increment being pressed with a different diameter punch and with a different gross tonnage. As the operation proceeds, each stroke must produce a different tonnage from the preceding stroke and from the succeeding stroke. An example of this type of work is the pressing of explosive material into artillery shells.

The hydraulic circuit associated with the motor 2 comprises a pump 14 having its suction side connected to a reservoir or tank 16, said pump having its discharge side connected to a pipe or line 18 connected to the inlet side of a conventional operating valve 20, said valve being actuated by a lever 22. A conventional safety relief valve 24 is provided in the line 18 between the pump 14 and the valve 20 for the purpose of permitting the pump 14 to discharge through a line 25 into the return or discharge line 26 in the event of blockage in the system, as, for example, jamming of the valve 20.

It will be understood by those skilled in the art that in the neutral position of the valve 20, the pressure fluid delivered by the pump 14 passes through the line 18 into the valve 20 and outwardly therefrom through the pipe or line 28 into the before-mentioned discharge line 26. In the advance position of the valve 20, pressure fluid delivered by the pump 14 is conveyed outwardly from the valve 20 through the advance or main supply line 30 into the advance chamber 10 of the cylinder 4, thereby causing the ram 6 to be moved on the advance stroke thereof. It may be noted that on the advance stroke of the ram 6, the hydraulic fluid within the chamber 12 is forced through the pipe 36 into the valve 20 and outwardly therefrom into the return line 26 through the pipe 28. When the ram reaches the end of its advance stroke, the fluid in the advance chamber 10 is conveyed from the cylinder 4 through a pipe 42 connected to the pipe 36 through a one-way check valve 44.

The pressure in the advance chamber 10 is regulated by a relief valve 32 in the line 30, said valve being adapted to open at a predetermined pressure to discharge into the before-mentioned discharge or return line 26. The pressure value at which the relief valve 32 opens is selectively varied, as hereinafter discussed, by one or more pressure selector valves 34. If desired, one valve 34 may be used and the inlet port thereof is connected by a pipe 35 to the relief valve 32, the outlet port of the valve 34 being connected by a pipe 37 to the return line 26 as hereinafter discussed. Where more than one valve 34 is desired, one of the discharge ports of the first valve 34 is connected by a pipe 39 to the inlet port of the other valve 34, the outlet port of which is connected by a pipe 41 to the return line 26. In this manner any desired number of valves 34 may be arranged in series to accommodate opening of the relief valve 32 at any desired number of predetermined pressure values.

In the return position of the valve 20, the pressure fluid delivered by the pump 14 to said valve is conveyed therefrom through a pipe or line 36 connected to the before-mentioned return chamber 12 of the cylinder 4, whereupon the ram 6 moves on the return stroke thereof to the point illustrated in the drawings, the hydraulic fluid in the chamber 10 being forced through the line 30 into the valve 20 and outwardly through the pipe 28 into the discharge line 26. In this connection it may be noted that when the ram 6 reaches the end of its return stroke, the pressure fluid in the return chamber 12 is conveyed from the cylinder 4 through an outlet pipe 38 connected to the line 30 through a one-way check valve 40.

Referring now to Figure 2, the relief valve 32 is illustrated in central vertical section, said valve being of the balanced piston type wherein the piston 46 is slidably fitted within a complementary bore 48 in the valve body 50 which is provided with a passage or chamber 52 normally conveying the fluid in the line 30 to and from the chamber 10. The piston 46 comprises a portion seated as at 54 against the inner extremity of a port 56 communicating with the discharge line 26, said piston being normally maintained in its closed position by a spring 58. The pressure at opposite sides of the piston 46 is balanced by a throttle passage or port 60 therethrough, said passage communicating with an outlet port 62 connected to the before-mentioned pipe 35. The port 62 also communicates with a chamber 64 normally closed by a valve member 66 spring-pressed to its closed position by a spring 68 adjustably compressed by a screw 70. When the pressure in the line 30 reaches a predetermined maximum value, the valve member 66 is urged to its open position, thereby permitting the piston 46 to be urged upwardly by the hydraulic pressure in the line 30 to permit the pressure therein to pass into the discharge line 26, the fluid in the chamber 64 being drained through a central passage 72 through the piston 46. The valve member 66 is preferably adjusted to open at a predetermined maximum value so that the valve member 66 functions as a safety valve mechanism.

Referring now to Figures 3 to 5, inclusive, one of the pressure selector valves 34 is illustrated in detail, said valve comprising a body, generally designated 74. The body 74 comprises a member 76 with a cap 78 secured thereto by cap screws 80, 80 (Figure 3) and the body 74 also comprises a base plate portion 82 secured to the bottom of the member 76 in any convenient manner as by cap screws (not shown). The member 74 is provided with a cylindrical bore 84 (Figure 4) receiving a complementary stem or spindle 86 slidably fitted therewithin in substantially fluid-tight engagement therewith, said stem being rotatable by a handle or knob 88 for a purpose hereinafter described. The member 76 is formed with a plurality of discharge or relief ports 90 connected to the bore 84, each of said ports being closed by a valve member 92 spring-pressed to the closed position thereof by a spring 94 adjustably compressed against the valve member by an adjusting screw 96, said screw extending through a conventional packing gland assembly 98. Each port 90 is connected by a passage 100 to an annular passage 102 (Figures 4 and 5) in the form of a groove formed in the top of the member 76, said passage 102 being connected by a port 104 to a chamber 106 defined within the bore 84 by a reduced portion 107 of the stem 86. The passage 102 is also connected to the outlet port 122 of the valve body 74, as best seen in Figures 3 and 5, said outlet port being connected to the line 37 as mentioned above.

The stem 86 is provided with an annular groove or passage 108 communicating at all times with the inlet port 110 of the valve body 74 and communicating with a vertical groove 112 adapted to be selectively registered with the ports 90. It may be noted that by means of the annular groove 108, the stem 86 is substantially in lateral balance inasmuch as the pressure of the fluid within the bore 84 is substantially evenly distributed to the stem 86 around the perimeter thereof. It will be understood that a slight amount of hydraulic fluid may leak between the stem 86 and the surface of the member 76 defining the bore 84, despite the fact that these parts are slidably fitted in a substantially fluid-tight engagement; and this leakage fluid is conveyed to the annular passage 102 through the chamber 106 and the passage 104, the chamber 106 being connected by a passage 114 through the stem to a recess 116 in the base plate 82, said plate being provided with a plurality of grooves or slots 118, as best seen in Figures 6 and 7, for the purpose of conveying any leakage fluid to the recess 116. It may also be noted that the plate 82 is provided with a plurality of openings 120 therethrough for the reception of associated cap screws (not shown) securing the plate 82 to the body member 76.

It may be noted that by means of the passage 114 which is spaced from the groove 108 in the stem 86, the pressure within the chamber 106 is balanced by that within the recess 116 at the bottom of the spindle 86 to prevent the latter from being urged downwardly into binding relationship with the base plate 82.

It will be understood that the spring 94 within each port 90 is adjustably stressed to a predetermined pressure preferably different from that of the springs 94 within the other ports 90, and the stem 86 is rotatable by the handle 88 to selectively place the vertical groove 112 in communication with the respective ports 90, whereby the inlet port 110 is connected to any one of the discharge ports 90 at the selection of the operator. Thus the operating pressure at which the piston 46 of the relief valve 32 is moved to its open position may be regulated to any one of a plurality of predetermined values by rotating the stem 86 to place any desired port 90 in communication with the inlet port 110 of the valve 74.

In operation of the system, pressure from the relief valve 32 is conveyed by the pipe 35 to the bore 84 of the selector valve 74 and the pressure fluid enters the circumferential groove 108 and flows all the way around the stem 86 and into the groove 112. From the groove 112, the pressure fluid is conveyed to one of the ports 90 wherein the valve member 92 remains in the closed position thereof as long as the pressure remains below the predetermined value at which the valve member 92 is arranged to open. When the pressure reaches this predetermined value, the valve member 92 is forced into the open position thereof, allowing the fluid to flow into the annular chamber 102 and thence into the outlet port 122 which is connected as above noted to the pipe 37 communicating with the discharge or relief line 26.

As a result of the opening of the valve member 92, the pressure in the relief valve 32 is reduced as above described in connection with the safety valve member 66, whereupon the relief valve piston 46 is permitted to move to the open position thereof to maintain the predetermined pressure value within the system.

Before initiating another advance stroke of the ram 6, the handle or knob 88 on the stem 86 may, if desired, be turned to some other position which delivers pressure fluid to some other port 90 wherein the valve member 92 is adjusted to open when the pressure in the system reaches another predetermined value. In this connection it may be noted that the stem 86 is maintained in each position thereof whereat the groove 112 communicates with one of the ports 90 by a detent mechanism, generally designated 124 and comprising an arm 126 carrying a latch pin 128 spring-pressed by a spring 130 into one of the shallow recesses 132 formed in the top of the cap member 78 of the body 74. The arm 126 may be secured to the stem 86 in any desired manner, as, for example, by a set screw.

It may be noted that the stem 86 extends through a complementary opening in the cap 78, said opening being sealed by a conventional packing gland assembly 136 maintained against accidental disassembly by a plurality of cap screws 138.

If desired, the valve member 92 and associated spring 94 may be removed from one of the ports 90 and said port may be connected by the before-mentioned pipe 39 to the inlet port 110 of another pressure selector valve 34, as above described and shown in Figure 1. In this manner, any desired number of valves 34 may be arranged in series to provide any desired number of predetermined pressure levels at which the relief valve 32 will open. Thus, when the range of the first selector valve 34 is exhausted, the last position of the stem 86 may be selected, which sends pressure fluid over to the second selector valve 34, which may then operate through its range before delivering the pressure fluid to the next selector valve.

It is to be understood that I do not wish to be limited by the exact embodiment of the device shown which is merely by way of illustration and not limitation as various other forms of the device will, of course, be apparent to those skilled in the art without departing from the scope of the claims.

I claim:

1. In a system of the class described, a supply line, means for selectively maintaining the pressure in said line at any one of a plurality of predetermined values, said last-mentioned means comprising a relief valve, a relief line connected to a port in said valve, a piston in said valve comprising means for normally closing said port, fluid passage means through said piston for conveying pressure fluid to opposite sides thereof to balance the hydraulic pressures thereagainst, a control port in said valve at the side of said piston remote from the first-mentioned port, a plurality of pressure selector valves connected in series and each comprising a plurality of independent relief valve means adapted to open at varying pressure values, each pressure selector valve having means for selectively connecting the control port to the relief valve means of said pressure selector valve and to the next pressure selector valve in series.

2. In a system of the class described comprising a supply line connected to an associated source of pressure fluid for conveying pressure fluid therefrom, and means for selectively maintaining the pressure in said line at any one of a plurality of predetermined values, said last-mentioned means comprising a normally closed relief valve having opening and closing areas acting upon by pressure fluid in said line and by trapped fluid, respectively, said valve having a throttle passage interconnecting said areas, said valve being adapted to open when the trapped fluid therein is bled off, a plurality of pressure selector valves connected in series and each comprising a plurality of independent bleeder valve means for bleeding off the trapped fluid at various pressure values, each of said selector valves comprising means for selectively connecting the trapped fluid to the bleeder valve means of said pressure selector valve and to the next pressure selector valve in series.

3. In a system of the class described; the combination of a line adapted to deliver fluid from an associated source, relief valve means comprising a casing having a valve chamber connected to said line and having an exhaust port connected to said chamber, a valve member having a portion slidably fitted in said valve chamber, said portion having an opening area facing the port and acted on by pressure fluid from said source, said member being adapted in the closed position thereof to close said port from communication with said valve chamber, spring means in said casing for urging said member to the closed position thereof, a plurality of pressure selector valves connected in series and each comprising a plurality of independent bleeder valves adapted to open at various pressure values, the first pressure selector valve in said series comprising means for selectively connecting its bleeder valves to said valve chamber at the side of said portion remote from said exhaust port and to the next pressure selector valve in said series, and each of the other of said pressure selector valves comprising means for selectively connecting its bleeder valves to the preceding selector valve, and a throttle passage connecting said line to said valve chamber at the side of said portion remote from said exhaust port.

4. In a system of the class described, a supply line connected to an associated source of pressure fluid, a relief valve comprising a chamber connected to said line, said valve having a casing portion with an exhaust port connected to the chamber and said valve having a movable piston portion closing said port, an opening pressure area on said piston portion acted on by pressure fluid from said source, another area on said piston portion opposing said opening area and acted on by fluid trapped in said valve, a throttle port through one of said portions interconnecting said areas, said piston portion being adapted to open the exhaust port when said trapped fluid is bled off from said valve, and a plurality of pressure selector valves arranged in series, each of said selector valves having a plurality of independent bleeder valve means for bleeding off the trapped fluid from said relief valve, and each of said selector valves having means for selectively connecting its bleeder valve means to the relief valve and for connecting the relief valve to the next selector valve in series.

5. In an hydraulic system comprising a supply line connected to an associated fluid pressure source, the combination of a pressure selector system comprising a pair of pressure selector valves each having a hollow body with an inlet port and a plurality of discharge ports, the inlet port of one valve being connected to one of the discharge ports of the other valve, the other discharge ports of both valves comprising independent relief valve means adapted to open at different pressure values, a selector stem in each body having passage means adapted to selectively connect the inlet port thereof with the discharge ports thereof, a relief valve having a casing with a chamber subjected to the pressure in said line, an exhaust port in said casing connected to said chamber, a stem adapted to close said exhaust port and having a piston-like portion slidably fitted within a bore of said casing, spring means for yieldingly urging said stem to the closed position thereof, throttle passage means through said portion, and a connection between the inlet port of said other pressure selector valve and the portion of said bore remote from said exhaust port.

FRANK G. CIZEK.

References Cited in the file of this patent

UNITED STATES PATENTS

| Number | Name | Date |
|---|---|---|
| 825,370 | Zurbuch | July 10, 1906 |
| 1,449,472 | Wesson | Mar. 27, 1923 |
| 1,498,477 | Nichles | June 17, 1924 |
| 1,538,167 | Chappell | May 19, 1925 |
| 1,755,451 | Morrison | Apr. 22, 1930 |
| 1,805,056 | Taylor | May 12, 1931 |
| 1,921,955 | Vickers | Aug. 8, 1933 |
| 2,192,778 | Stacy | Mar. 5, 1940 |
| 2,218,818 | Harrington | Oct. 22, 1940 |
| 2,250,389 | Miller | July 22, 1941 |
| 2,267,177 | Twyman | Dec. 23, 1941 |
| 2,310,100 | Losey | Feb. 2, 1943 |
| 2,351,841 | Seem | June 20, 1944 |

FOREIGN PATENTS

| Number | Country | Date |
|---|---|---|
| 408,900 | Great Britain | Apr. 19, 1934 |